US010510101B2

(12) United States Patent
Faust et al.

(10) Patent No.: US 10,510,101 B2
(45) Date of Patent: Dec. 17, 2019

(54) MERCHANT MANAGEMENT SYSTEM FOR ADAPTIVE PRICING

(71) Applicant: Jet.com, Inc., Montclair, NJ (US)

(72) Inventors: Nathan Thomas Faust, Chatham, NJ (US); Michael Thomas Hanrahan, Ridgewood, NJ (US); Marc Eric Lore, Mountain Lakes, NJ (US)

(73) Assignee: JET.COM, INC., Hoboken, NJ (US)

( * ) Notice: Subject to any disclaimer, the term of this patent is extended or adjusted under 35 U.S.C. 154(b) by 499 days.

(21) Appl. No.: 15/212,506

(22) Filed: Jul. 18, 2016

(65) Prior Publication Data

US 2017/0018013 A1 Jan. 19, 2017

Related U.S. Application Data

(60) Provisional application No. 62/194,147, filed on Jul. 17, 2015.

(51) Int. Cl.
*G06Q 30/02* (2012.01)
*G06Q 30/06* (2012.01)

(52) U.S. Cl.
CPC ..... *G06Q 30/0283* (2013.01); *G06Q 30/0239* (2013.01); *G06Q 30/0633* (2013.01)

(58) Field of Classification Search
None
See application file for complete search history.

(56) References Cited

U.S. PATENT DOCUMENTS

| 7,424,445 | B1* | 9/2008 | Cue | G06Q 30/06 |
| | | | | 705/26.2 |
| 8,438,052 | B1* | 5/2013 | Chanda | G06Q 30/0282 |
| | | | | 705/7.11 |
| 8,630,923 | B2 | 1/2014 | Rothman | |
| 9,092,810 | B2* | 7/2015 | Kajamohideen | G06Q 30/0601 |
| 2002/0174021 | A1* | 11/2002 | Chu | G06Q 10/063 |
| | | | | 705/7.11 |
| 2007/0150369 | A1* | 6/2007 | Zivin | G06Q 30/02 |
| | | | | 705/26.64 |

(Continued)

OTHER PUBLICATIONS

Zhou, Bin, Katehakis, Michael, and Zhao, Yao. Managing Stochastic Inventory Systems with Free Shipping Option. European Journal of Operations Research 196 p. 186-197, www.ScienceDirect.com (Year: 2009).*

(Continued)

*Primary Examiner* — Stephanie Z Delich
(74) *Attorney, Agent, or Firm* — Bryan Cave Leighton Paisner LLP

(57) ABSTRACT

A merchant management system aims to make product sales by multiple merchants more efficient so that the resulting savings can be passed down to consumers. Specifically, the merchant management system evaluates discounts that the consumer may be eligible for (e.g., being within a certain shipping distance, buying multiple units, or waiving the ability to return the item) in order to present the consumer with the lowest price available. Additionally, the merchant management system may price a product in light of other products and pass down any savings that result from purchasing multiple products from the same merchant (e.g., reduced shipping costs for shipping multiple products in the same box).

20 Claims, 7 Drawing Sheets

(56) References Cited

U.S. PATENT DOCUMENTS

| | | |
|---|---|---|
| 2008/0235147 A1 | 9/2008 | Jensen |
| 2012/0116897 A1 | 5/2012 | Klinger et al. |
| 2012/0179516 A1* | 7/2012 | Fakhrai .............. G06Q 30/0207 |
| | | 705/14.1 |
| 2013/0046610 A1 | 2/2013 | Abraham |
| 2013/0075464 A1 | 3/2013 | Van Horn et al. |
| 2014/0156392 A1* | 6/2014 | Ouimet .................. G06Q 30/02 |
| | | 705/14.49 |
| 2015/0302424 A1* | 10/2015 | Akbarpour .......... G06F 16/9535 |
| | | 705/7.29 |

OTHER PUBLICATIONS

Mack, Ann M. Choose Me IChoose alerts E-shoppers to better offers. Brandweek; Apr. 10, 2000, 41, 15; ABI/INFORM Global, p. 106. (Year: 2000).*

PCT International Search Report, PCT Application No. PCT/US16/42807, dated Oct. 4, 2016, 14 pages.

\* cited by examiner

|            | Product 1 | Product 2 | Product 3 |
|------------|-----------|-----------|-----------|
| Merchant A | $20       | N/A       | $33       |
| Merchant B | $21       | $9        | $35       |
| Merchant C | $22       | $10       | $30       |

Fig. 5A

| Combination # | Product 1 | Product 2 | Product 3 | Eligible? | Total Price | Box Discount | Cart Price |
|---|---|---|---|---|---|---|---|
| 1  | Merchant A | Merchant B | Merchant A | Yes | $62 | $2  | $60 |
| 2  | A | B | B | Yes | $64 | $2  | $62 |
| 3  | A | B | C | Yes | $59 | N/A | $59 |
| 4  | A | C | A | Yes | $63 | $2  | $61 |
| 5  | A | C | B | No  | xxx | xxx | xxx |
| 6  | A | C | C | Yes | $60 | $2  | $58 |
| 7  | B | B | A | Yes | $63 | $1  | $62 |
| 8  | B | B | B | Yes | $65 | $4  | $61 |
| 9  | B | B | C | Yes | $60 | $1  | $59 |
| 10 | B | C | A | No  | xxx | xxx | xxx |
| 11 | B | C | B | Yes | $66 | $2  | $64 |
| 12 | B | C | C | Yes | $61 | $2  | $59 |
| 13 | C | B | A | No  | xxx | xxx | xxx |
| 14 | C | B | B | Yes | $66 | $2  | $64 |
| 15 | C | B | C | Yes | $61 | $2  | $59 |
| 16 | C | C | A | Yes | $65 | $1  | $64 |
| 17 | C | C | B | Yes | $67 | $1  | $67 |
| 18 | C | C | C | Yes | $62 | $4  | $58 |

Fig. 5B

MERCHANT MANAGEMENT SYSTEM FOR ADAPTIVE PRICING

CROSS-REFERENCE TO RELATED APPLICATIONS

This application claims the benefit of U.S. Provisional Application No. 62/194,147, filed on Jul. 17, 2015.

BACKGROUND

This application relates generally to pricing products, and in particular to efficiently pricing products from a plurality of merchants.

Many consumers opt to use online shopping in addition to or in lieu of physically going to a store to buy products. Online shopping allows consumers to conveniently purchase products remotely, which in turn makes it easier to shop around for the lowest prices and purchase products from multiple merchants. Merchant marketplaces facilitate the sale of products by multiple merchants by providing a single place for different merchants to sell their products. Oftentimes, multiple merchants offer the same product but at different prices. In these situations, merchant marketplaces often make the lowest price most prominent.

However, these prices are set generally, not tailored to the consumer that is purchasing the product. Because of this, merchants and/or merchant marketplaces have to make sure that the price they are offering adequately covers known contingencies. For example, if the merchant offers free shipping, they need to make sure that they add enough to the base price of the product to cover the maximum (or in some cases, average) shipping cost. However, even if the actual cost to ship the product to consumer is lower than the shipping cost that is included in the product price, the consumer still pays that amount instead of having those savings passed down to them.

SUMMARY

A merchant management system aims to make product sales by multiple merchants more efficient so that the resulting savings can be passed down to consumers. Specifically, the merchant management system evaluates discounts that the consumer may be eligible for (e.g., being within a certain shipping distance, buying multiple units, or waiving the ability to return the item) in order to present the consumer with the lowest price available. Additionally, the merchant management system may price a product in light of other products and pass down any savings that result from purchasing multiple products from the same merchant (e.g., reduced shipping costs for shipping multiple products in the same box).

BRIEF DESCRIPTION OF THE DRAWINGS

FIG. 5A is an example table of product prices for products offered by multiple merchants.

FIG. 5B is an example table of cart combinations for products offered by multiple merchants.

Figure 1:
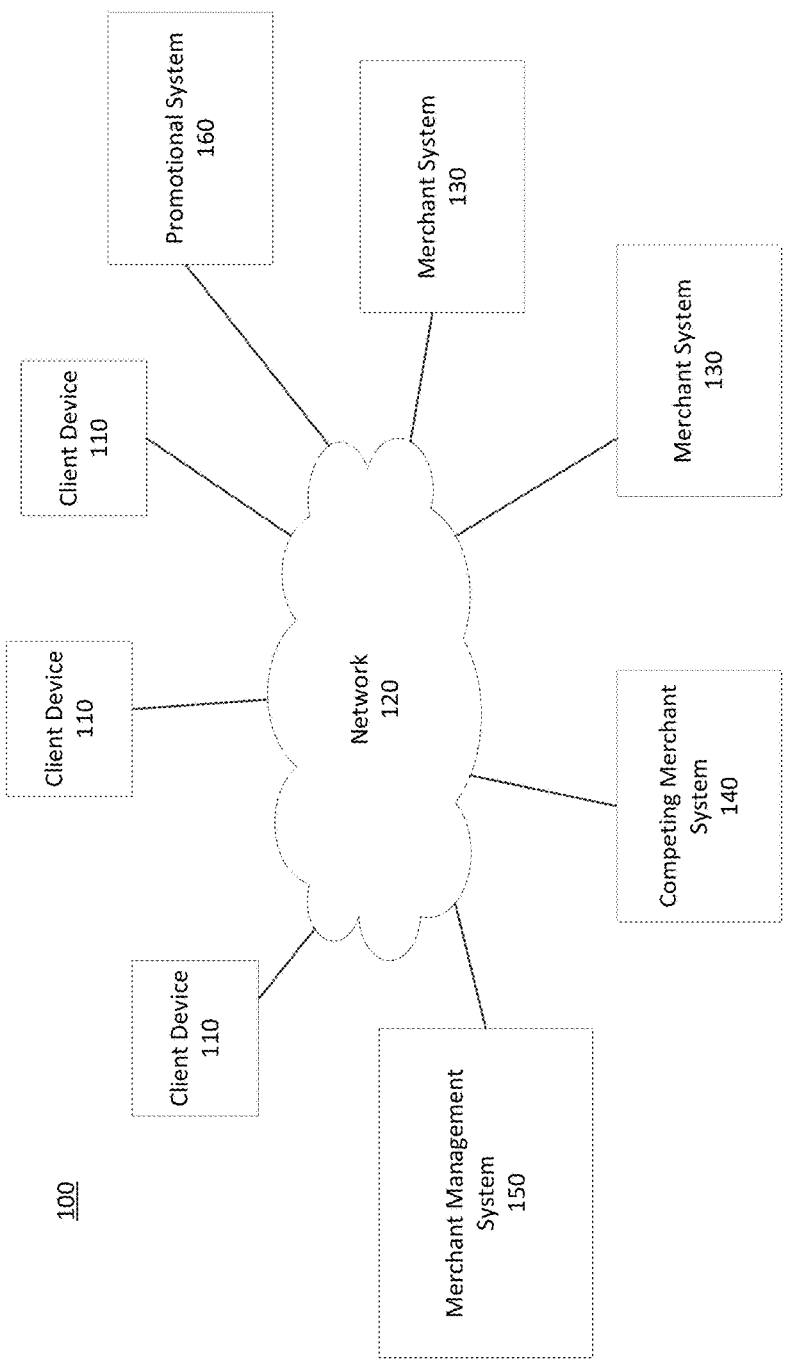
FIG. 1 is a block diagram of a system environment for a merchant management system, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A merchant management system facilitates the sale of products from merchants to users of client devices and optimizes selection of merchants and product prices to reduce systematic inefficiencies associated with purchasing products. The merchant management system presents products available at the various merchants to a user and provides a portal for selecting and purchasing products. As users select products for purchase, the merchant management system evaluates (A) the most efficient price for the individual selected products and (B) whether the selected products can be combined with other products in a shipment or to generate other efficiencies with products the user has already placed in a cart for purchase. This evaluation may select one or more merchants to fulfill the request by incorporating the shipping locations of the merchants to determine discounts available when products for an order are combined for shipping and provide other discounts that may be specific to a merchant. The merchant management system determines these efficiencies and may pass these efficiencies to a user as savings based on a cart of items selected by the user. In this way, as users select products, the additional products may generate further efficiencies and increase a savings level across the other products in a user's cart. Such efficiencies may be based, for example, on shipping location, a user's payment method, cart size, refund policies, and other conditions of sale for an order.

Merchants sell and ship products to customers. Each merchant may maintain its own merchant product pricing for products that are fulfilled through that merchant. When a user views products at the merchant management system, the merchant management system determines a product price for the products based on each merchant that offers the product and its merchant base price. The merchant base price may account for the costs to ship the product to the user from each merchant. For a particular user, a merchant system submits a merchant offer for a product at a merchant offer price, which is based on the merchant base price for the product and accounts for shipping that product individually to the user. The lowest merchant offer price is selected as the individual product price, which is presented to the user on the merchant management system. In some embodiments, additional merchant-specific discounts based on the number or type of product may be included in the individual product price. Merchant-specific discounts may also be based on a user's acceptance of various policies from a merchant, such as waiving a return policy. The user may select a product to put into a cart, where they can place an order to purchase one or more products. In some embodiments, the merchant management system also calculates a cart discount that results from shipping multiple products from a single merchant system. To generate the cart discount, the merchant management system evaluates combinations of merchants to fulfill the order and evaluates reduced costs by the combination, even if those orders are fulfilled by merchants with higher merchant offer prices than that which was chosen as the individual product prices. The cart discount may cause the overall price for the combination of items to be lower than the sum of the individual product prices taken. The cart discount thus determines which merchants will ship the items to a user, and reduces the costs of the entire order by using discounts for the products in the cart.

System Architecture

FIG. 1 is a high level block diagram of a system environment 100 for a merchant management system 150. The system environment 100 shown by FIG. 1 comprises one or more client devices 110, a network 120, one or more merchant systems 130, one or more competing merchant systems 140, one or more promotional systems 160 and the merchant management system 150. In alternative configurations, different and/or additional components may be included in the system environment 100. The merchant management system 150 provides an interface for users to purchase products offered by merchant system 130 and determines discounts for the products as further described below.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the merchant management system 150. For example, a client device 110 executes a browser application to enable interaction between the client device 110 and the merchant management system 150 via the network 120. In another embodiment, a client device 110 executes a native application running on the client device 110 that interacts with the merchant management system 150 through an application programming interface (API) of the merchant management system 150.

The network 120 provides a channel through which the various systems communicate, and may comprise any combination of local area and/or wide area networks, using both wired and/or wireless communication systems.

One or more merchant systems 130 may be coupled to the network 120 for communicating with the merchant management system 150 and client devices 110. The merchant systems 130 sell products to users of the client devices 110 through the merchant management system 150. These products can be physical goods, digital goods, or services. The merchant systems 130 may also sell products to the users of the client devices 110 separately and without interfacing with the merchant management system 150.

For physical goods, each merchant associated with a merchant system 130 maintains a physical inventory of products that are available to sell and can store those products in one or more warehouses associated with the merchant system 130. The merchant system 130 maintains a database of the inventory available at each warehouse for that merchant. The number and locations of the one or more warehouses associated with each merchant system 130 vary according to each merchant's physical warehouse operations. The merchant may space out warehouses geographically instead of locating multiple warehouses near each other. Typically, a merchant system 130 selects warehouse locations based on operational costs and the locations of users who purchase products from the merchant system 150. This allows the merchant system 130 to minimize shipping distances (and thus shipping costs) by increasing the likelihood of a particular user's shipping location being near one of the warehouses. Additionally, for that reason, a product offered by the merchant may be stocked in several different warehouses. For example, a merchant system 130 has three warehouses located in San Jose, Calif.; Atlanta, Ga.; and Milwaukee, Wis. If the only warehouse that stocks coffee is the warehouse in Milwaukee, it will cost more to ship the coffee to a user located in Mountain View, Calif. than if the San Jose warehouse also stocked coffee and could ship the coffee to the user located in Mountain View.

For digital goods and services, the merchant systems 130 can maintain a database of its inventories as applicable. For example, if there is no limit on how many units of a particular electronic book (a digital good) a merchant system 130 can sell, there is no need to record an inventory value for that product. However, if a merchant system 130 only has a set number of digital licenses for the electronic book, it is necessary to store information about the inventory level for that product.

Merchant systems 130 can also provide the merchant management system 150 with merchant rules that affect the pricing of their products. These merchant rules can relate to discounts given on the merchant's products based on user shipping locations, the number of units of a product being purchased, return policies, payment methods, and purchase of warranties. Merchant rules and the associated discounts are described further in conjunction with the merchant data store 205 of FIG. 2.

One or more competing merchant systems 140 may additionally be coupled to the network 120. The competing merchant systems 140 are similar to the merchant systems 130 in purpose and operation. However, the competing merchant systems 140 do not sell products through the merchant management system 150 and instead compete with the merchant management system 150 for sales to users. Thus, prices offered by competing merchant systems 140 are competition for those offered by merchant systems 130 through the merchant management system 150.

One or more promotional systems 160 may also be coupled to the network 120. The promotional systems 160 are associated with products but do not offer products directly. For example, a promotional system 160 may be a manufacturer or brand of a particular product. The promotional systems 160 can also define merchant-independent merchant rules that affect merchant offer prices. For example, a promotional system 160 associated with Brand A can provide a discount of 20% off of Brand A diapers regardless of which merchant system 130 offers the diapers.

Figure 2:
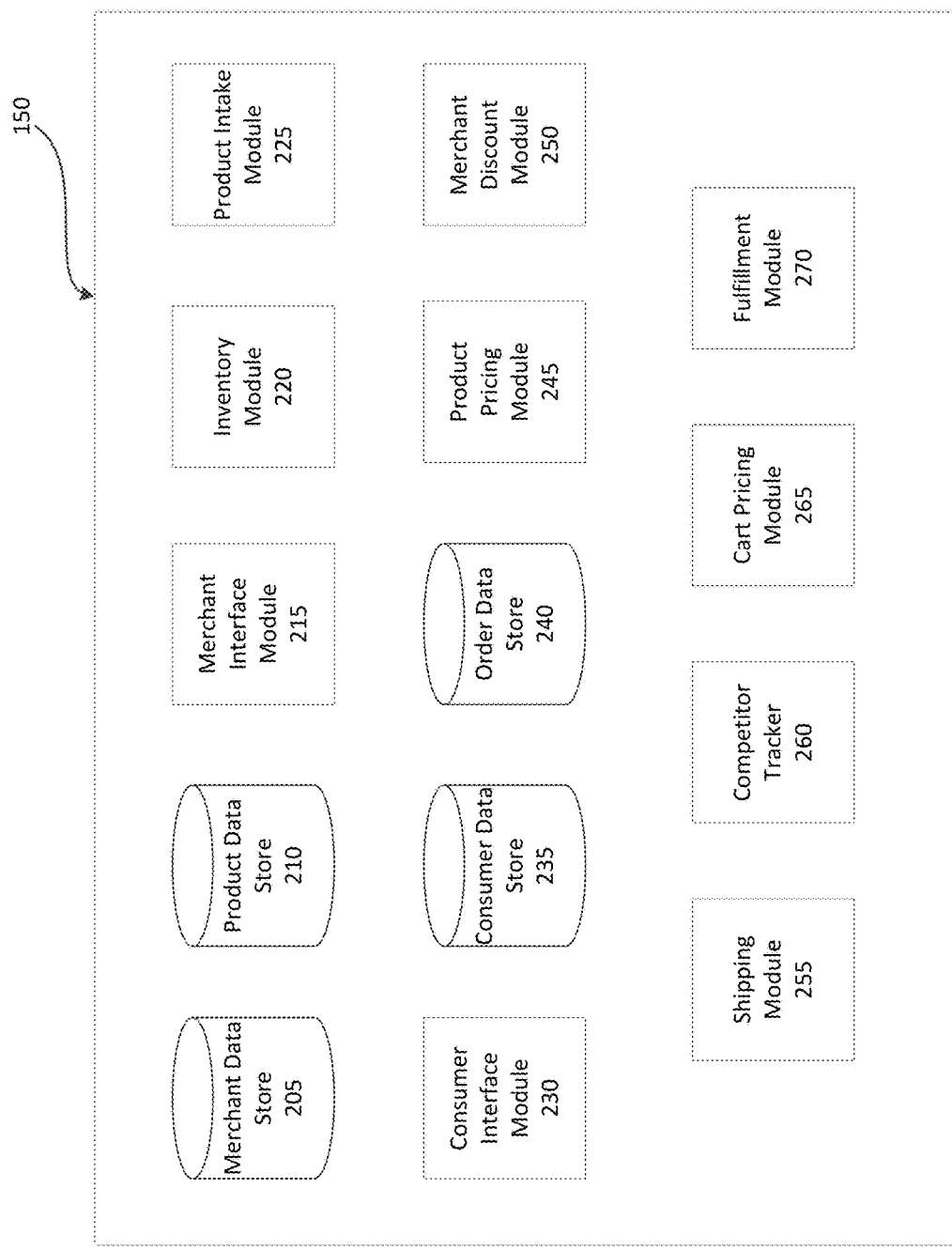
FIG. 2 is a block diagram of an architecture of a merchant management system, according to one embodiment.

FIG. 2 is a block diagram of an architecture of the merchant management system 150, according to one embodiment. In some embodiments, the merchant management system 150 operates as a merchant system 130 in addition to performing the functionality described below. That is, the merchant management system 150 may also maintain a set of products to be fulfilled by the merchant management system 150. The merchant management system 150 shown in FIG. 2 includes a merchant data store 205, a product data store 210, a merchant interface module 215, an inventory module 220, a product intake module 225, a consumer interface module 230, a consumer data store 235, an order data store 240, a product pricing module 245, a merchant discount module 250, a shipping module 255, a competitor tracker 260, a cart pricing module 265, and a fulfillment module 270. In other embodiments, the merchant management system 150 may include additional, fewer, or different components for various applications. Conventional components such as network interfaces, security functions, load balancers, failover servers, management and network operations consoles, and the like are not shown so as to not obscure the details of the system architecture.

The product data store 210 stores product information for products offered by the merchant management system 150. Each product may be offered by one or more of the merchant systems 130. The product information includes a product identifier that uniquely identifies the product to distinguish a product from other products. One example product identifier is a Stock Keeping Unit (SKU) for each product. For example, long black yoga pants from Brand A has a different product identifier than cropped black yoga pants from Brand A and long black yoga pants from Brand B. The product identifier may be set by the merchant management system 150, by industry convention, or by the original manufacturer of a product.

Additional product information may include a descriptive product title, product descriptions, product size and weight, and pricing from competing merchant systems 140. In some embodiments, only the lowest price offered by the competing merchant systems 140 is stored. The products in the data store 210 may include any individually-purchasable product, such as combinations of other products or products that include multiple of the same products (a "multipack"). Each combination or multipack may thus be associated with its own product identifier and product information. For example, a combination product including a water bottle and an arm band may have a distinct product identifier, though the individual products may also be offered as separately.

The merchant data store 205 maintains information specific to individual merchant systems 130. This merchant-specific information includes shipping information, product information and merchant rules specific to individual merchant systems 130.

Shipping information is used to determine shipping costs for products sold by the merchant system 130. Shipping information can include the number and location of warehouses associated with a merchant system 130. The merchant management system 150 determines the shipping cost for a particular item based on the warehouse locations. In some embodiments, the merchant system 130 determines the shipping cost for its products based on its own shipping pricing rules. In this case, the shipping pricing rules set by the merchant system 130 are also included in the shipping information. The shipping pricing rules can include flat-rate shipping costs based on order price, flat-rate shipping costs based on shipping weight, and formulaic shipping costs based on one or both of shipping distance and shipping weight. For example, the merchant system 130 may charge $5 for shipping for orders that cost under $25, $10 for orders between $25-$100 and $15 for orders over $100. For example, the merchant system 130 may charge $0.10 per mile of shipping distance and $2 per pound of shipping weight. In other embodiments, the merchant system 130 integrates shipping costs into its merchant base prices and does not have any further shipping pricing rules.

Product information stored at the merchant data store 205 is related to the products that are offered for sale by the merchants, including each merchant's inventory and pricing for products offered by the merchant. Thus, the merchant data store 205 identifies which products are offered by individual merchants and provides further information for that merchant's sale of those items. The inventory of a merchant system 130 identifies which products are sold by a merchant and includes an identifier and number of units for each product that the merchant system 130 has available for sale. When a merchant system 130 identifies a product by another product identifier than the identifier used by merchant management system 150, the product information may also include a mapping between product identifiers that identify products at the merchant management system 150 and an identifier for the product at the merchant system 130. In some embodiments, the product information also specifies shipping weight and shipping dimensions for a merchant that varies from the shipping weight and dimension stored at product data store 210. In some embodiments, inventories are warehouse-specific and stored in conjunction with the warehouses in addition to the merchant system 130. In one embodiment, rather than storing inventory and pricing for individual merchants at the merchant management system 150, the merchant management system 150 retrieves inventory and pricing from the merchant system 130 when necessary.

Merchants may elect to set merchant-specific merchant rules that are used by the merchant management system 150 to determine discounts included in a user's product price. In the absence of merchant rules set by the merchant, the merchant management system 150 may apply a set of default merchant rules or merchant rules that supersede merchant rules provided by a merchant. Thus, in one embodiment, the merchant rules are set by the merchant management system 150 instead of the merchant systems 130. In another embodiment, some merchant rules are applied by the merchant management system 150 across all merchant systems 130. In yet another embodiment, some merchant rules are set by the promotional systems 160 and are applied by the merchant system 150 across all merchant systems 130. Various types of merchant rules are described below, and include a bulk discount, a returnability discount, a payment method discount, a shipping discount, a warranty discount, and a brand discount.

A "bulk discount" merchant rule applies to users that purchase more than one unit of a particular product in a single order. Bulk discounts can be offered as a percentage of the merchant base price or as a set discount amount per unit. A bulk discount can be triggered by certain numbers of units and remain constant within those ranges. For example, buying 1-5 units may not result in a bulk discount, while buying 6-25 units results in a 5% discount and buying 25+ units results in a 8% discount. Alternatively, the bulk discount may be proportional to the number of units purchased, up to a cap percentage or amount. For example, each unit after the first unit purchased may result in an additional 0.25% discount, up to 30%, such that two units receives a 0.25% discount, while three units receives a 0.50% discount, 16 units receives a 4% discount, and 121+ units receives a 30% discount.

A "returnability discount" merchant rule applies to users that waive the right to return a product. Returnability discounts can be offered as a percentage of the merchant base price, or as a set amount. A returnability discount may require that the user cannot return the product at all, or that the user would have been able to return the product for free but would now need to pay a fee if they later decide that they would like to return the product. For example, a merchant system 130 can offer a user 10% off of the merchant base price if they choose waive the right to return a product that would have been free to return, but require that the user pay a $10 fee if they do decide to return the product. If the merchant base price is $50, the user would be able to buy the product for $45, but would only receive $35 if they returned it.

A "payment method discount" merchant rule applies to users that have selected particular payment methods. Payment method discounts are generally offered as percentages of the merchant base price based on fees that are charged to the merchant systems 130 by entities associated with particular payment methods. For example, a first credit card issuer may impose a 3% fee on merchants, and a second credit card issuer may impose a 2% fee on merchants, while direct transfers from bank accounts and payments via electronic checks are not associated with any fees for the merchant. A merchant system 130 might thus set their merchant base price assuming that they will need to cover the first credit card issuer's 3% fee and then be able to give the user a discount of 1% if the user pays with credit card from the second credit card issuer, or a discount of 3% if the user pays with an electronic check.

A "shipping discount" merchant rule applies to users with shipping locations within certain distances of a merchant's warehouse. Shipping discounts can be offered as a percentage of the merchant base price, a set amount, or a different between a shipping cost that is already included in the merchant base price and an actual shipping cost for a particular user. For example, users with shipping locations within 50 miles of a warehouse associated with the merchant system 130 may be offered a shipping discount of 5% of the merchant base price. Shipping discounts may also be offered as a difference between the shipping cost included in the merchant base price and the actual shipping cost that is calculated by the merchant management system 150. In one embodiment, shipping discounts are only offered by merchant systems 130 that have shipping costs included in their merchant base prices.

Additionally, a warranty may be offered for a product. A merchant may offer a "warranty discount" for a product based on profits for warranties sold on the product. The profits may be expected profits or may be historic profits based on projected revenue and warranty redemption. Some or all of this profit may be provided by the merchant management system 150 as a warranty discount on the product. For example, if a warranty for a product costs 5% of the merchant base price and 50% of the price of the warranty is profit, a user can be offered a discount of 2.5% of the merchant base price when purchasing the warranty with the product.

A "brand discount" may be offered for a particular brand of product. Brand discounts can be offered as a percentage of the merchant base price, or as a set amount. Brand discounts determined by a promotional system 160 may apply to a particular merchant system 130, a set of merchant systems 130 (e.g., authorized sellers) or all merchant systems 130. Brand discounts may depend on the brand of the other products in a cart. For example, Brand A may offer a brand discount if a product from Brand B is in a cart. For example, Brand A may offer a brand discount of 20% for its paper towels if Brand B paper towels are in a cart. In some embodiments, a brand discount is offered based on the manufacturer of the product.

The merchant interface module 215 interfaces with merchants and merchant systems 130 to receive and update merchant-related information. Certain merchant information may be manually entered by a merchant, while other information may be automatically retrieved from the merchant systems 130. The merchant interface module 215 generates a user interface that is displayed to an operator of a merchant system 130 that interacts with the user interface to manually input information. The information received by the merchant interface module 215 may include merchant rules, as well as inventory and pricing information. As noted below, the inventory and pricing may also be automatically retrieved by the inventory module 220.

The inventory module 220 retrieves product information, pricing, and inventory from merchant systems 130 and stores such inventories to the merchant data store 205. The inventory module 220 thus provides an interface to retrieve information from merchant systems 130 and update information about products offered by a merchant. The inventory module 220 may retrieve inventory information at specified times, such as once a day, or may query the merchant systems 130 for inventory information when a request is made to purchase or fulfill a particular product to determine real-time product availability by the various merchants. For each product, the quantity of that product for each merchant is retrieved from the merchant data store 205 to accurately reflect the products and related quantities that the merchant management system 150 can offer to users.

The product intake module 225 adds new products to the product data store 210. If, when retrieving a merchant's inventory, the inventory module 220 receives an identifier from the merchant for a product that it cannot identify in the product data store 210, the product information is sent to the product intake module 225. The product intake module 225 creates a product identifier for the product, and stores the product information in the product data store 210. In one embodiment, the product intake module 225 uses an identifier received from a merchant as a product identifier, such as a merchant's identifier or a manufacturer identifier, and does not create a separate product identifier for the product.

The consumer interface module 230 provides a user interface for users to interact with the merchant management system 150. The user interface generated by the consumer interface module 230 allows the users to navigate products offered on the merchant management system 150. Additionally, the user interface allows users to select products to purchase and place orders for those products. The user interface generated by the consumer interface module 230 is described further in conjunction with FIGS. 6A and 6B.

The consumer data store 235 stores user information collected by the consumer interface module 230. User information may include various information relating to purchasing products though merchant management system 150, such as purchase history information describing the user's past purchases. User information can also include a default shipping location and default payment information. User information can be collected by the consumer interface module 230 through user prompts, or inferred by the merchant management system 150 based on the user's purchase history information. In one embodiment, the default shipping location and default payment information are the shipping location and payment information used for the user's most recent purchase. The user information can be stored in a user profile that is unique to each user.

The order data store 240 stores information related to in-progress and completed orders. Each order has an order identifier and includes a user purchasing the order, the products and related quantities in the order, and pricing information. The user information can include a user identifier. The pricing information can include the product prices and fulfilling merchant system 130 for each product in the order, as well as the discounts applied to the user's order.

The product pricing module 245 determines individual product prices for individual products offered to users of the merchant management system 150. Because products may be offered by several eligible merchants and various discounts may be available, the product pricing module 245 determines which price select for a given user as their individual product price for that product. The product price for a product is based on merchant offer prices offered by merchant systems 130 and any applicable merchant rule discounts. The individual product price for a product is determined without respect to other products that may be purchased by the user. That is, as if the user is purchasing the product individually. In some embodiments, this individual product price is ultimately the product price that is presented to the user. In others, the product price is based off of the individual product price. As described below in conjunction with the cart pricing module 265, as a user adds additional products to an order, various discounts may apply that permit the product to be fulfilled by another merchant system 130 than the one on which the individual product price is based, potentially making the product price lower than the individual product price.

When a user accesses a product or otherwise views a product, the individual product price is calculated for a user based on user-independent merchant base prices of the merchant systems 130 that offer the product. Initially, merchant offer prices are determined for each merchant system 130 that offers the product. Merchant offer prices are the merchant base prices offered by the merchant systems 130 adjusted by discounts determined by the merchant discount module 250. In one embodiment, the merchant systems 130 provide their cost data to the merchant management system 150 such that the merchant management system 150 does not need to interface with the merchant systems 130 to determine merchant offers. In another embodiment, merchant offer prices are calculated by the merchant systems 130, and the merchant management system 150 determines merchant offer prices by retrieving them from the merchant systems 130. In this embodiment, the merchant systems 130 may calculate the merchant offer prices for each product based on information about the cart that is sent to the merchant systems 130 by the merchant management system 150.

The lowest merchant offer price is selected as the individual product price that is selected for the user. Prices offered by competing merchant systems 140 can also be taken into consideration. In one embodiment, the individual product price is never higher than the lowest competitor price determined by the competitor tracker 260. In this embodiment, when the lowest merchant offer price is higher than the lowest competitor price, the merchant management system 150 sets the individual product price to be equal to the lowest competitor price. When evaluating a merchant offer price for a product, a user may be queried to determine a shipping location, warranty options, and so forth applicable to the product. The product pricing module 245 queries the merchant discount module 250 to determine discounts for a product applicable to the user and the user's selected product with respect to the eligible merchants.

The merchant discount module 250 calculates discounts that are specific to particular merchants. These discounts are based on merchant rules stored in the merchant data store 205. The calculated discounts are provided to the product pricing module 245 for inclusion in the product price. For example, the merchant rules may provide a discount as indicated above based on selection of a warrantee, waiver of returnability, and so forth, as set out by a the applicable merchant rules for a merchant.

The shipping module 255 calculates shipping costs for one or more products that are to be fulfilled by a particular merchant system 130. The shipping module 255 may provide shipping costs for individual products, or may incorporate multiple products into a single shipment, for example to provide a cart-based "box discount" as further described below. Thus, the shipping module 255 may receive a set of products, a merchant and a shipping destination to determine the shipping cost for sending the set of products to the shipping destination from the merchant. Shipping costs may depend on shipping-related information, such as shipping distance, shipping dimensions, and shipping weight. Shipping distance is determined by determining a warehouse from which the designated merchant may provide the set of products, and the distance to the specified shipping destination. In some embodiments, the merchant system 130 that is to fulfill the one or more products has multiple warehouses that can fulfill the products. In this case, the warehouse that minimizes the merchant shipping cost when shipping the product to the shipping location is selected. For example, the warehouse that is closest to the user shipping location may result in the lowest merchant shipping cost and thus would be chosen over warehouses that are further away from the user shipping location.

In some embodiments, the merchant base price provided by the merchant system 130 includes shipping costs. In this case, it may calculate a shipping discount based on merchant rules or a difference between the shipping cost that is included in the merchant base price and a shipping cost calculated by the shipping module.

The competitor tracker 260 collects information about the prices offered by competing merchant systems 140 through the network 120. The competitor tracker 260 analyzes one or more competing merchant systems 140 to determine which products offered on the competing merchant system 140 correspond to the products offered by the merchant management system 150. In some embodiments, only a single competing merchant system 140 is analyzed with respect to individual products. Once the products have been matched, the competitor price offered for the product by the competing merchant system 140 is identified and stored in the product data store 210. Additionally, the competitor tracker 260 may check the same competing merchant systems 140 repeatedly to ensure that the stored competitor prices are up-to-date. In one embodiment, the competitor tracker 260 only stores a single competitor price and replaces it when a lower competitor price is found. Thus, only the lowest known competitor price is stored in the product data store 210.

The cart pricing module 265 determines a "cart discount" and product price for a product based on one or more other products in a cart. A cart is a prospective order of products prior to confirmation and payment by a user to finalize the order. As a user browses products at the merchant management system 150, the user may add products to the cart. As the user adds products to the cart, the cart discount is calculated and applied to the price of products in the cart to reduce the price of the total purchase (i.e., the cart). In addition to calculating the cart discount for an existing cart, the cart discount may also be determined for individual products that are not yet part of the cart and calculated based on that product prospectively added to the cart. Thus, if a current cart includes five products, a cart discount may be calculated with respect to the cart price of the five products in the current cart. In addition, as a user browses products at the merchant management system 150, when an additional product is shown to a user, the additional product may be added to the existing five-item cart to determine a cart discount if the user adds the additional item to the existing cart. Thus, the five-item cart is evaluated with the additional product to determine a cart discount, as though all six items had been added to the cart. The cart discount accounting for the additional item, showing a discount relative to the five-item cart, may be shown with the additional item to reflect an the additional discounts available when the additional item is added to the cart.

The cart discount accounts for a reduction in price that may accrue from several products sold together in an order. Many times, when a merchant sells multiple products together instead of individually, the merchant is able to save on various costs, such as shipping. For example, shipping multiple items in a single box is cheaper than shipping the multiple items in their own individual boxes because the cost of shipping generally involves a base rate per package plus a rate based on weight. Thus, cart discounts reflect efficiencies generated by purchasing multiple products from a single merchant.

To determine a cart discount, the cart pricing module 265 evaluates cart prices for various combinations of merchants fulfilling the requested products. That is, for a given set of products, more than one combination of merchants may fulfill the order. Each combination, referred to as a "cart combination," assigns a specific \ merchant to fulfill each product in the cart. For example, if there are three products, 1-3, in a cart, and three merchants, A-C, each of which offers each of the three products, there are 27 possible combinations of merchants A-C providing the products. In this example, for products $\{P_1, P_2, P_3\}$ the cart combinations include $\{A, A, A\}, \{A, A, B\}, \ldots, \{C, C, B\}, \{C, C, C\}$. An example of these cart combinations is further shown with respect to FIGS. 5A-B.

Because the cart discounts may provide significant discounts to prices for a cart, the savings available when more than one product is fulfilled through a merchant may cause that merchant to provide a lower merchant offer price, though another merchant originally had a lower merchant offer price for the product, which may have been selected as the individual product price for the product. For cart combinations in which a single merchant is assigned to fulfill multiple products, the cart pricing module 265 sends the products that are offered by the single merchant to the shipping module 255, which determines a box discount based on shipping those products together. In the example above, for $\{A, A, B\}$, in which the first two products are fulfilled by merchant A, the first two products are sent to the shipping module 255 to determine a box discount for the first two items. The third product fulfilled by merchant B is also evaluated to determine the shipping cost for the third product. This process is repeated until all sets of multiple merchant offers from single merchant systems 130 are associated with the applicable box discounts. The box discount is the difference between the original product prices for individual items in the cart compared against the costs when fulfilled by specific merchants. Stated another way, the cart price is the sum of the product prices of the products, less the sum of the box discounts. For some cart combinations, there may not be a combination of merchants that sell more than one product, in which case that product may not have any box discount.

The cart pricing module 265 determines a cart discount based on cart prices of the various cart combinations of merchant assignments. Because it can be computationally intensive to evaluate cart discounts for every possible combination of merchant offer prices, the cart pricing module 265 may only evaluate "eligible" combinations. Combinations are deemed eligible if each merchant offering a product in the combination meets at least one of the following three criteria: 1) the merchant offering the product was selected when calculating its individual product price; 2) the cart includes multiple units of the product and the merchant was selected when calculating the product price for multiple units of that product; or 3) the combination includes one or more merchant offer prices from the same merchant system 130. Once eligible combinations are evaluated, the cart pricing module 265 selects the combination of merchants to fulfill the order with the lowest cart price. The cart discount is then the difference between the sum of the cart price before the prospective product was included and the individual product price of the prospective product, and the cart price of the selected cart combination. For example, a cart contains five products and has a cart price of $25, and a prospective product has an individual product price of $10. If the selected cart combination including the prospective product has a cart price of $30, the cart discount is $5. This cart discount can then be allocated to the prospective product (e.g., the product price is the individual product price minus the cart discount), the cart as a whole, or across the various products of the cart.

In some embodiments, the cart pricing module 265 only calculates the cart discount for finalized carts (i.e., when the user places the order) and determines an expected cart discount for all other carts and products that may be prospectively added to carts. The expected cart discount may be generated based on assumptions for discounts that will likely apply to the product without determining the exact cart discount via the merchants as described above. The expected cart discount may therefore be less computationally-intensive because it can be determined based on assumptions about the products in the cart and the merchants offering the products, rather than actual calculations about which prices merchants are able to offer. The assumptions can include product characteristics, product prices, product categories, the location of the user and merchant warehouses, behavior of similar merchants, and inventory pools. For example, an expected cart discount can be calculated based on the assumption that Merchant A is able to give a 20% discount on household cleaning products in the same cart. Additionally, the user location may be used to assume a discount based on shipping distance to a merchant's warehouse. As another example, an expected cart discount can be calculated based on the assumption that Merchant B is similar to Merchants C and D, which are able to offer a $5 cart discount for products over $40. The assumptions used for determining the expected cart discount may be based on data analysis of prior transactions and may be re-evaluated as more transactions are performed through the merchant management system 150.

When the product prices for products in a cart are based on an expected cart discount and the cart is finalized, the cart pricing module 265 calculates the actual cart discount for the cart. If there is a disparity between the expected cart discount and the actual cart discount, the merchant management system 150 may adjust the displayed cart discount to match the actual cart discount. For example, if the actual cart discount is $5 more than the expected cart discount that was presented to the user, upon finalizing their cart, the user might receive $5 in additional savings.

Once an order is placed by a user, the fulfillment module 270 sends orders to merchant systems 130 for fulfillment. The orders that are placed by users can involve products that are provided by several different merchant systems 130. The fulfillment module 270 splits up user orders up according to the merchant systems 130 providing the products. The merchant system 130 providing each product was determined by the product pricing module 245 and the cart pricing module 265 and stored in the order data store 240. For example, if a user has placed an order with three products provided by two merchant systems 130, the user order is split into two sub-orders, each of which is sent to the merchant system 130 fulfilling the sub-order.

Product Pricing

Figure 3:
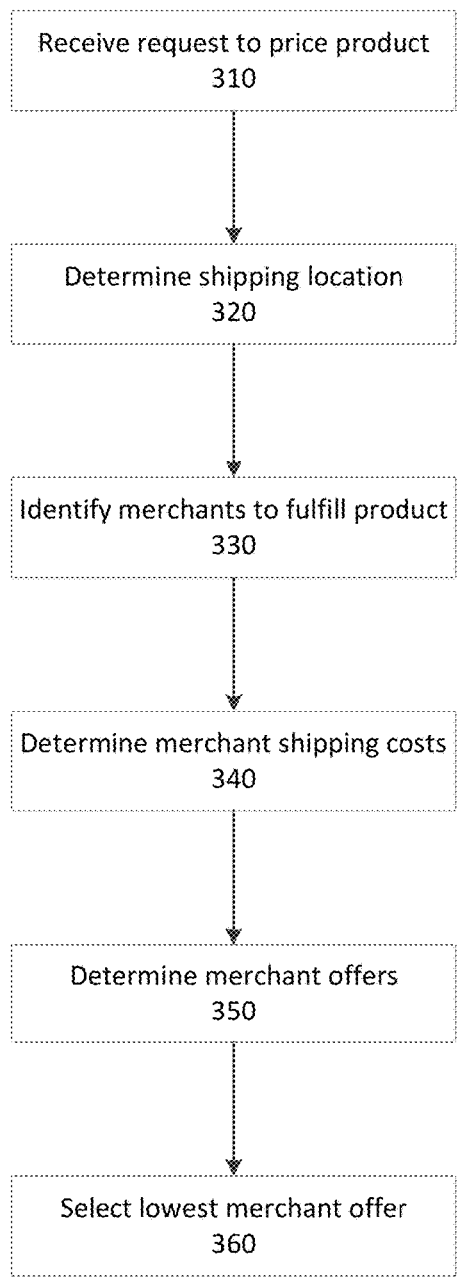
FIG. 3 is a flowchart illustrating a method for determining a product price for a product, according to one embodiment.

FIG. 3 is a flowchart illustrating a method for determining an individual product price for a product, according to one embodiment. The process to determine an individual product price is triggered by receiving 310 a request to price an product for a specific user. Requests to price products can include the user adding an products to their checkout cart, viewing a preview of a product (e.g., in a search results page) and viewing a page for a product. Alternatively, a request to price a product can be an explicit request from the user.

Upon receiving 310 a request to price the product, the merchant management system 150 determines 320 a shipping location associated with the user for which the individual product price has been requested. In one embodiment, the user is prompted to enter a desired shipping location. In another embodiment, the merchant management system 150 retrieves a shipping location that is stored in association with the user. For example, the user may have a default shipping location stored in their user profile. A default shipping location may be explicitly entered by the user or inferred from one or more previous orders with the merchant management system 150. For example, the most recent shipping location may be stored as the default shipping location.

Additionally, the merchant management system 150 identifies 330 merchant systems 130 that are capable of fulfilling the product. In one embodiment, all merchant systems 130 that offer the item are considered capable of fulfilling the product. In another embodiment, only merchant systems 130 that have the product in stock are considered capable of fulfilling the product. Additional criteria can be applied to merchant systems 130 to determine which merchant systems 130 are capable of fulfilling the product. For example, the only merchant systems 130 located in the same country as the user shipping location may be considered capable of fulfilling the product.

For each merchant system 130 that is capable of fulfilling the product, the merchant management system 150 determines 340 a merchant shipping cost. The merchant shipping cost is based on shipping distance, shipping weight and shipping dimensions, as described in conjunction with the shipping module 255 of FIG. 2. In one embodiment, the shipping weight and shipping dimensions of a product are provided by the specific merchant system 130 offering the product instead by the product data store 210 of the merchant management system 150.

In some embodiments, the merchant management system 150 does not need to determine 340 the merchant shipping cost because the merchant base prices provided by the merchant systems 130 already take the shipping cost into account. Instead, the merchant management system 150 can determine applicable shipping discounts based on merchant rules of the merchant systems 130. In other embodiments, the merchant management system 150 does not determine 340 the merchant shipping cost because the product is not a physical good (e.g., software) and thus does not need to be shipped.

The merchant management system 150 then determines 350 a merchant offer price for each merchant system 130. The merchant offer prices are based on merchant base prices from merchant systems 130 and are determined by combining the merchant base price and the applicable shipping cost or shipping discount. In some embodiments, the merchant management system 150 additionally determines other discounts (i.e., those based on merchant rules) that are factored into the determined 350 merchant offer prices. Finally, the merchant management system 150 selects the lowest merchant offer price to present as the individual product price.

Figure 4:
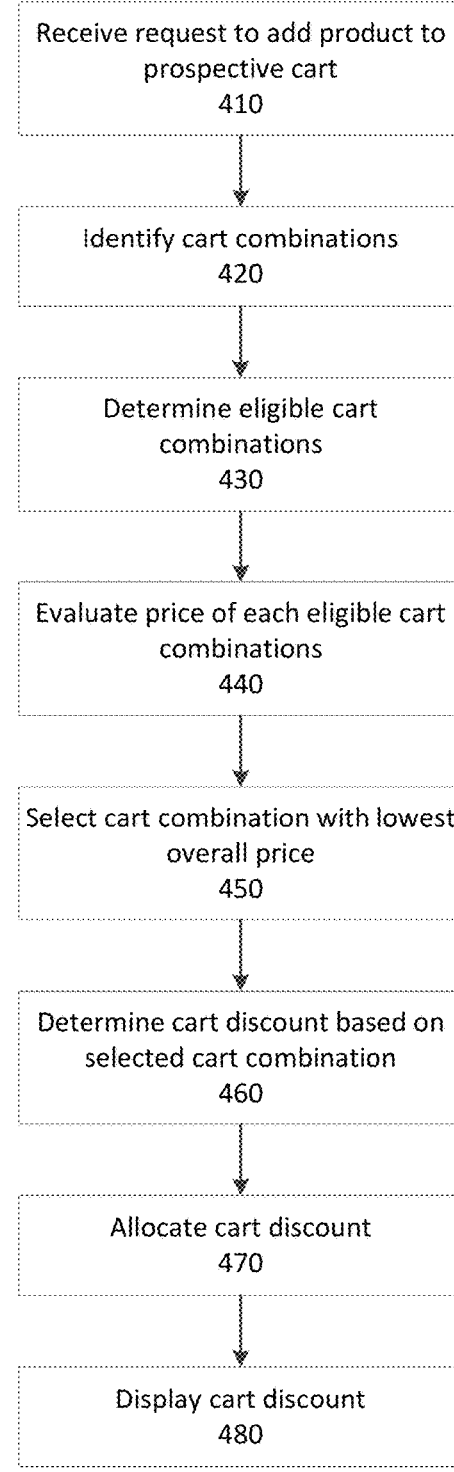
FIG. 4 is a flowchart illustrating a method for determining a cart discount for a product in a cart, according to one embodiment.

FIG. 4 is a flowchart illustrating a method for determining a cart discount for a product in a cart, according to one embodiment. The merchant management system 150 begins to determine a cart discount upon receiving 410 a request to add a product to a cart of one or more other products. A request to add a product to a cart can be responsive to the user adding the product to their cart. Alternatively, a request to add a product to a cart can be triggered by the user viewing a preview of the product or viewing a page for the product. Though this product viewed in the preview or product page is not yet in the user's cart, the cart discount may be evaluated as though the cart already included that product to determine whether that product would generate an additional cart discount.

The merchant management system 150 identifies 420 all possible cart combinations. A cart combination is a combination of merchant offers for all of the products in the cart (including the newly added prospective product). Examples of cart combinations are shown in FIGS. 5A and 5B. Because carts with many products can result in a large number of cart combinations, it would be computationally-intensive to evaluate all possible cart combinations. Accordingly, the merchant management system 150 determines 430 eligible cart combinations based on the criteria described in conjunction with the cart pricing module 265 in FIG. 2.

For each eligible cart combination, the merchant management system 150 evaluates 440 the price. To evaluate 440 a price for a cart combination, the merchant management system 150 calculates a box discount based on shipping multiple products from the same merchant system 130. The cart price for the cart combination then is the sum of the individual product prices for the products less the box discount.

The merchant management system 150 then selects 450 the cart combination with the lowest cart price. The cart discount is then determined 460 based on the selected cart combination. After the cart discount has been determined 460, the merchant management system 150 allocates the cart discount to a particular product or the cart as a whole. Allocating the cart discount indicates which product the cart discount applies to. The cart discount can be allocated 470 to the price of the prospective product, to the cart overall, or to the prices of all of the products in the cart. Finally, the merchant management system 150 displays 480 the cart discount in conjunction with the product or products it to which it has been allocated 470.

FIG. 5A is an example table of merchant offers for multiple products by multiple merchants systems 130, according to one embodiment. The table shows three products that are offered by three merchants. Product 1 is offered by three merchant systems 130. Merchant A offers Product 1 for $20, Merchant B offers Product 1 for $21, and Merchant C offers Product 1 for $22. Product 2 is offered by two merchant systems 130. Merchant B offers Product 2 for $9, and Merchant C offers Product 2 for $10. Product 3 is offered by three merchant systems 130. Merchant A offers Product 3 for $33, Merchant B offers Product 3 for $35, and Merchant C offers Product 3 for $30.

FIG. 5B is an exemplary table of cart combinations for products offered by multiple merchants, according to one embodiment. FIG. 5B details the cart combinations for the merchant offers in FIG. 5A. Because Merchant A does not offer Product 2, cart combinations specifying Merchant A offering Product 2 are not listed. Out of the 18 cart combinations listed, only 15 are eligible to be evaluated based on the rules described in conjunction with cart pricing module 265 in FIG. 2. Combinations 5, 10, and 13 are not eligible because the merchant offers for Products 1, 2, and 3 are neither offered by the same merchants, nor chosen for the product prices for the products. Combination 3 includes all of the merchant offers chosen for the product prices for the individual products, resulting in the lowest price of $59 before box discounts are considered. However, after the box discounts have been calculated and taken into consideration for the actual price of the cart combination, Combinations 6 and 18 have the lowest cart price of $58.

Product 3 is being added to a prospective cart already containing Products 1 and 2. Priced on its own, the product price of Product 3 is $30 (offered by Merchant C). Priced as its own cart, the cart price of the prospective cart only containing Products 1 and 2 is $29 because Products 1 and 2 are sold, respectively, by Merchant A for $20 and Merchant B for $9 without any box discount. Thus, the sum of the cart price of Products 1 and 2 and the product price of Product 3 is $59. Because the lowest cart price (i.e., if either of combinations 6 or 18 are chosen) is $58, the difference between the aforementioned sum and the lowest cart price is $1, resulting in a cart discount of $1.

Figure 6A:
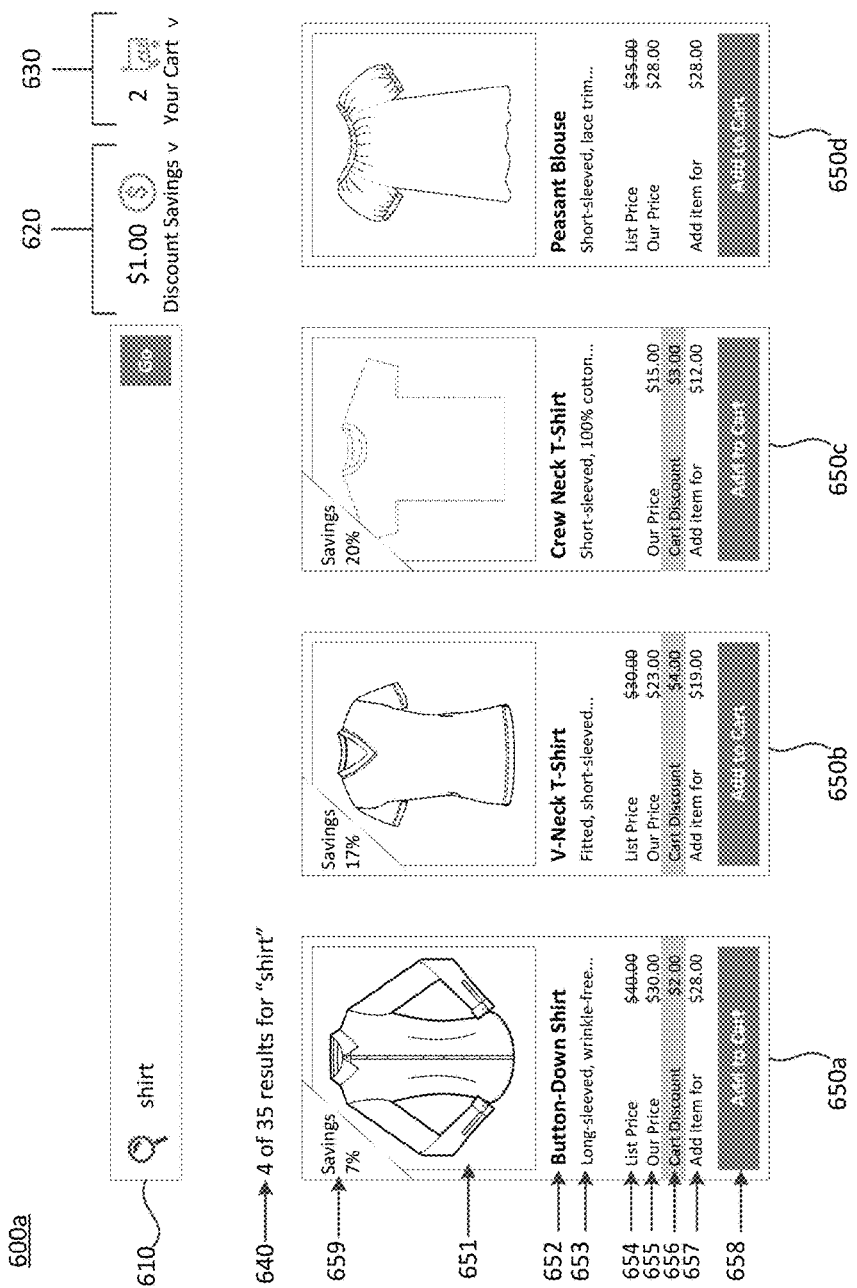
FIG. 6A is a user interface illustrating a cart discount for products, according to one embodiment.

FIG. 6A is an illustration of a user interface 600a for searching for products, according to one embodiment. The user interface 600a allows users to search for products using search terms (e.g., "shirt") entered into the search bar 610. The user interface 600a can also have discount tracker 620 and cart tracker 630 related to the user's overall savings and items in their checkout cart. The discount tracker 620 indicates discounts applied to the products in a cart and how much the user has saved on top of the products' product prices due to discounts (e.g., cart discounts). The cart tracker 630 indicates how many items are in the user's checkout cart. Both trackers 620 and 630 may have a descriptive title (e.g., "Discount Savings," "Your Cart") and a recognizable icon (e.g., a dollar sign, a cart), in addition to the values corresponding to the tracker. Additionally, the trackers 620 and 630 may be expandable to include more information. For example, expanding the discount tracker 620 may detail the breakdown of the total discount savings value, including which product in the user's checkout cart each discount is associated with. For example, expanding the cart tracker 630 may show the products in the user's checkout cart.

Because there may be more search results than can be displayed in the user interface 600a at one time, the user interface 600a can also have a search indicator 640 indicating how many search results are shown out of the total number of search results for the search term. Each of the search results corresponds to a particular product and is displayed through a product preview 650. The product preview 650 can include descriptive information about the product, such as a product image 651, a product name 652, and a product description preview 653. The product description preview 654 includes at least some of the product description, though many times it does not include all of the description. Additionally, the product preview 650 can include pricing information and an add-to-cart button 658. The pricing information can show some or all of a list price 654, an individual product price 655, a cart discount 656, and a product price 657. The list price 654 may be a price offered by competing merchant systems 140, or a price set by the manufacturer of the product, such as a manufacturer's suggested retail price. The list price 654 may be struck out in order to indicate that is not the price the user would pay. The cart discount 656 may be visually highlighted to draw the user's attention to how much they are saving with the cart discount 656. The product price 657 is the individual product price 655 less the cart discount 656 (or its allocated portion of the cart discount 656), and reflects how much it would cost for the user to buy the product.

In some embodiments, the list price 654 is not shown, as illustrated in product preview 650c. The list price 654 may not be shown if it is equal to or very close to the product price 655. The list price 654 may also not be shown to deter users from selecting a product on which the merchant management system 150 loses money to ensure that the product price 655 is at least equal to the lowest price offered by competing merchant systems 140.

In some embodiments, no cart discount 656 is shown, as illustrated in product preview 650d. The cart discount 656 is not shown if there is no cart discount that can be calculated for that product. For example, the product may not share any common merchant systems 130 that can fulfill the product with the products already in the user's checkout cart. In some embodiments, savings from the individual product price 655 and that cart discount 656 are combined such that users only see the list price 654 and a total amount of savings.

The savings indicator 651 may reflect a savings amount or percentage received by the user. In one embodiment, the savings amount is calculated based off of the list price 654. In another embodiment, the savings amount is calculated based off of the individual product price 655. In some embodiments, no savings indicator 651 is shown, as illustrated in product preview 650d. This can be the case if there is no further savings from the list price 654 or the product price 655 (e.g., no cart discount 656 can be calculated).

Figure 6B:
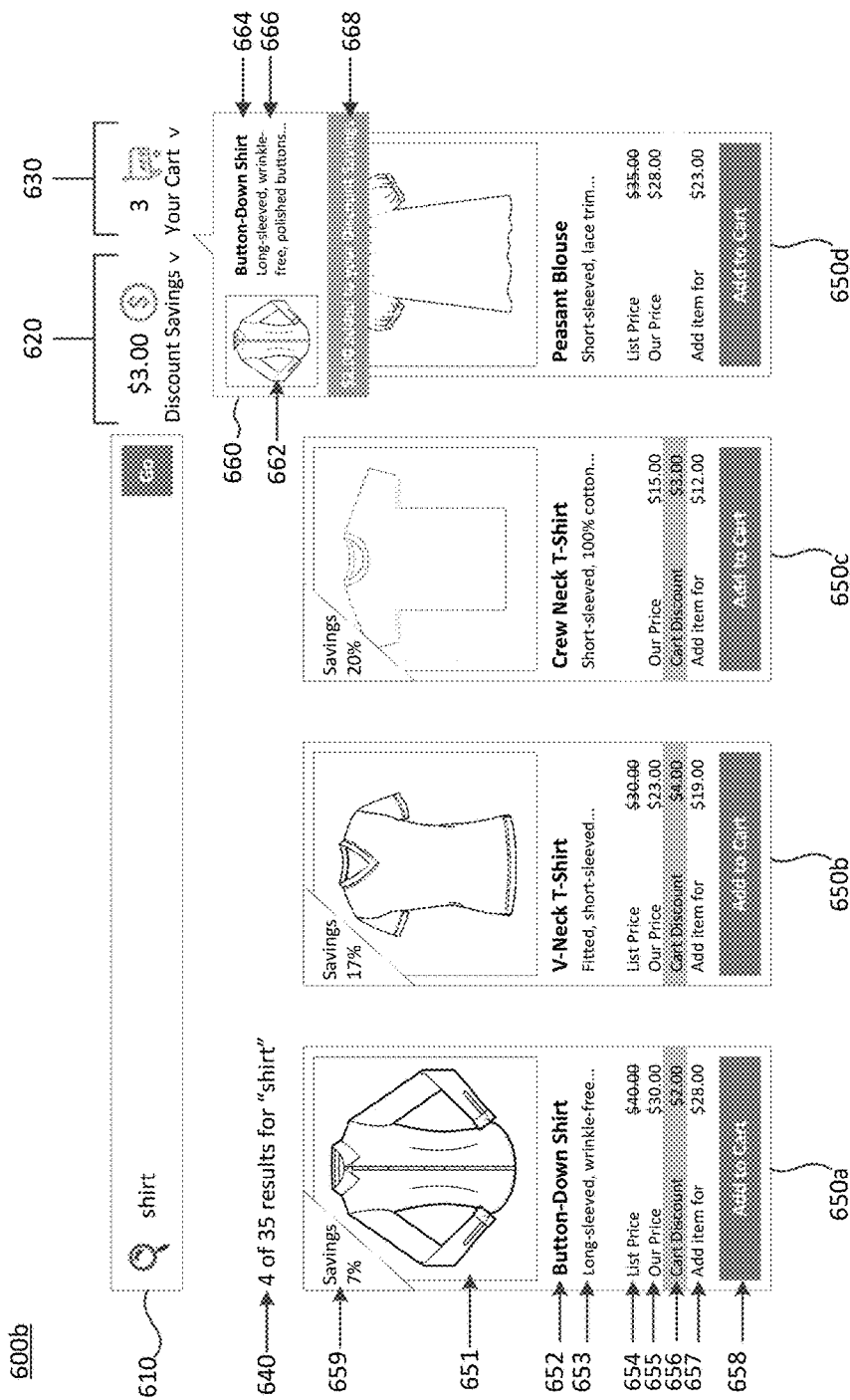
FIG. 6B is a user interface further illustrating a cart discount for products, according to one embodiment.

FIG. 6B is an illustration of the user interface 600b of FIG. 6B after adding a product to a checkout cart, according to one embodiment. Upon pressing the add-to-cart button 658 of a product preview, the savings tracker 620 and cart tracker 630 update to include the added product. A dropdown indicator 660 overlaid on the user interface 600a from FIG. 6A summarizes information about the added product. For example, the dropdown indicator 660 can include the added product image 662, the added product title 664, and the added product description preview 666. Additionally, the dropdown indicator 660 can have a savings alert 668 that states and highlights how much has been added to the user's discount savings.

Figure 7:
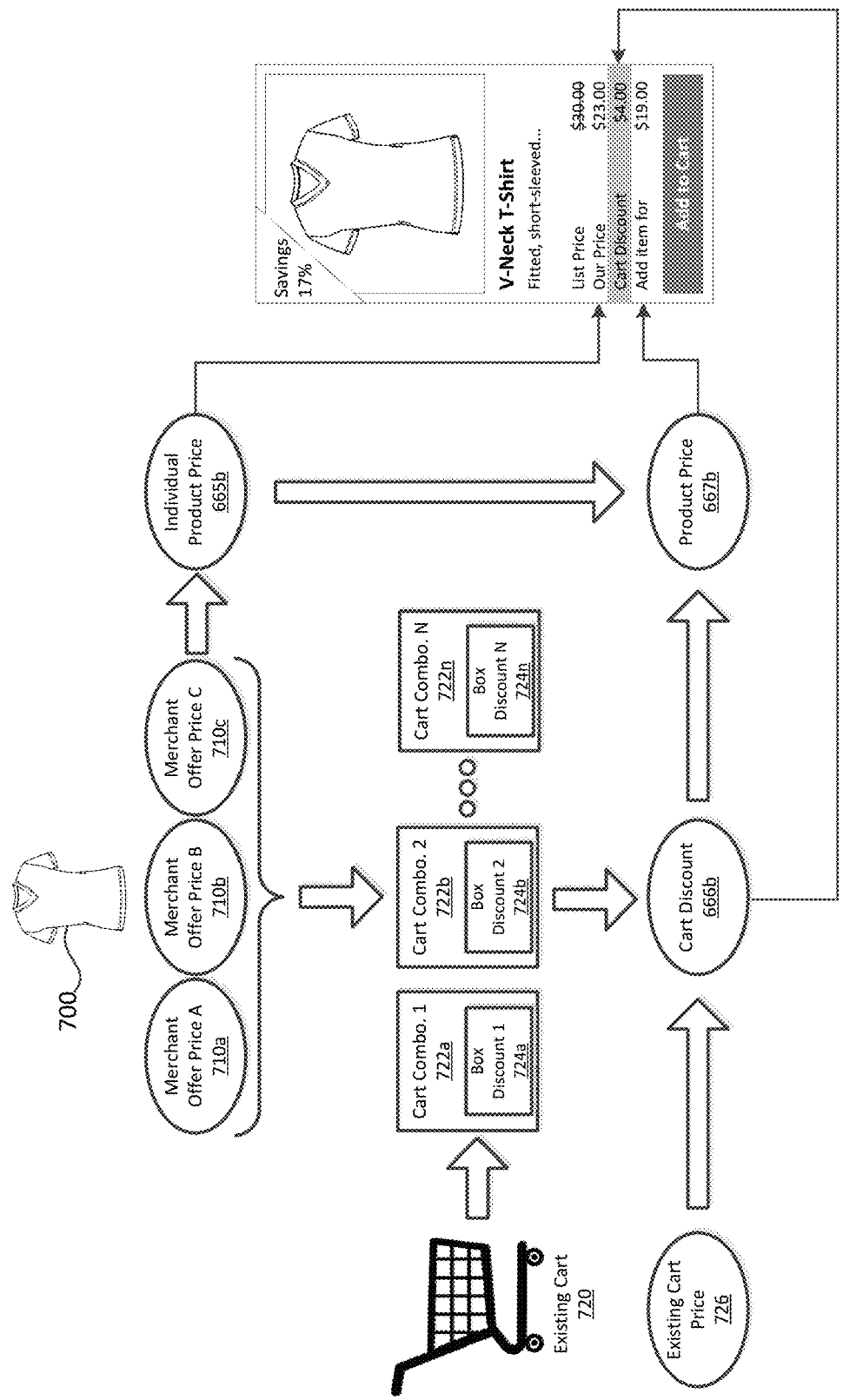
FIG. 7 illustrates the relative relationships between merchant offer prices, the existing cart price, the individual product price, the cart discount, and the product price for an example product.

FIG. 7 illustrates the relative relationships between merchant offer prices 710, the existing cart price 726, the individual product price 665b, the cart discount 666b, and the product price 667b for a prospective product 700. Merchants A, B, and C offer the prospective product 700 and submit merchant offer price A 710a, merchant offer price B 710b, and merchant offer price C 710c, respectively. The merchant management system 150 selects the individual product price 665b based on the various merchant offer prices 710a-c as discussed above. The offer price may be set by each merchant, or may reflect the offer price after application of various discounts and adjustments.

To determine the cart discount 666b, the prospective product 700 merchant offer prices 710a-710c are organized into cart combinations 722 with the other merchant offer prices for the products in the existing cart 720. As noted above, these cart combinations assign different merchants to fulfill the products in the prospective cart. The merchant management system 150 calculates a box discount 724 for each cart combination 722, which is combined with the merchant offer prices of the cart combination 722 to determine the cart price. The cart discount 666b is then the sum of the individual product price 665b and the cart price 726 of the existing cart 720 minus the determined cart price for the cart including the prospective product 700. The cart discount 666b is then allocated (completely or in part) to the individual product price 665b to determine the product price 667b.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, from a user of a merchant management system:
      a request to price a first product as part of a prospective cart, the prospective cart comprising the first product and one or more other products in an existing cart, each respective product of the first product and the one or more other products being sold by one or more merchants of a plurality of merchants that offer the respective product at a respective offer price; and
      a competing price for the first product, the competing price having been collected from a competing merchant management system;
   identifying a plurality of cart combinations for the prospective cart via the merchant management system, each cart combination of the plurality of cart combinations being a different combination of merchants of the plurality of merchants assigned to the products of the prospective cart, each merchant of the plurality of merchants for the products of the prospective cart assigned from the one or more merchants offering the respective product;
   evaluating a price for each cart combination of the plurality of cart combinations by combining the respective offer price for each assigned merchant;
   determining at least one cart discount for each cart combination of the plurality of cart combinations by calculating savings of each cart combination of the plurality of cart combinations, the savings of each cart combination of the plurality of cart combinations resulting from the first product and at least one of the one or more other products being fulfilled by a same merchant of the one or more merchants;
   selecting a first cart combination of the plurality of cart combinations based on a lowest price of the first cart combination compared to other cart combinations of the plurality of cart combinations, the first cart combination resulting in at least one discount of the first cart combination, the at least one discount of the first cart combination comprising the at least one cart discount;
   determining a product price of the first product based on the first cart combination, as selected, compared to a price of the existing cart; and
   in response to determining the product price of the first product, transmitting instructions to display, on an electronic device of the user, a user interface comprising:
      an information portion comprising a search bar, a discount tracker, and a cart tracker, wherein:
         the discount tracker is configured to:

display a sum of each discount of the at least one discount of the first cart combination; and when selected by the user, display, in an expanded configuration, an itemized list showing a source of each discount of the at least one discount of the first cart combination; and the cart tracker is configured to display a number of the first product and the one or more other products in the existing cart;

a search indicator displayed on the user interface only after the request to price the first product has been received, the search indicator configured to display:
search results in response to the request to price the first product; and
a total number of search results returned in response to the request to price the first product; and a product preview portion comprising:
a product image of the first product;
a product name of the first product;
a product description preview of the first product;
an add to cart button configured to, when selected by the user, add the first product to the existing cart; and
pricing information comprising:
the competing price of the first product;
the respective offer price of the first product for a merchant of the plurality of merchants;
the at least one discount; and
the product price of the first product.

2. The computer-implemented method of claim 1, wherein the price of the existing cart is based on a first assignment of merchants of the plurality of merchants to the first product and the one or more other products of the existing cart, wherein the first cart combination includes a second assignment of merchants of the plurality of merchants to the first product and the one or more other products of the existing cart, the merchants of the first assignment being different from the merchants of the second assignment.

3. The computer-implemented method of claim 1 further comprising:
receiving a request to add the first product to the existing cart;
receiving a request to purchase the existing cart including the first product; and
electronically coordinating a sale of the existing cart from each merchant assigned to the first product and the one or more other products in the existing cart in the first cart combination.

4. The computer-implemented method of claim 3, wherein electronically coordinating the sale of the existing cart comprises:
generating one or more sub-orders for the merchants included in the first cart combination, each sub-order of the one or more sub-orders comprising one or more sub-order products that a merchant of the plurality of merchants associated with the sub-order is assigned to fulfill based on the first cart combination; and
transmitting each sub-order of the one or more sub-orders to its associated merchant for fulfillment of associated one or more sub-order products of the sub-order.

5. The computer-implemented method of claim 3 further comprising:
storing one or more payment methods of the user, each payment of the one or more payment methods of the user having an associated fee;

determining:
a payment method of the one or more payment methods of the user having a lowest fee; and
a payment method of the one or more payment methods of the user having a highest fee;
in response to receiving the request to purchase the existing cart including the first product, transmitting instructions to display, on the electronic device of the user, a second user interface comprising a selectable element for each payment method of the one or more payment methods; and
when the user selects a selectable element for the payment method of the one or more payment methods of the user having the lowest fee, applying a payment method discount comprising a difference between the highest fee and the lowest fee.

6. The computer-implemented method of claim 1 further comprising:
allocating the at least one cart discount between the first product and the one or more other products of the prospective cart, wherein the at least one discount further comprises the at least one cart discount, as allocated with respect to prices of the first product and the one or more other products of the prospective cart.

7. The computer-implemented method of claim 1 further comprising:
determining one or more eligible cart combinations from the plurality of cart combinations, wherein the one or more eligible cart combinations consist of one cart combination.

8. The computer-implemented method of claim 7, wherein a cart combination of the plurality of cart combinations is eligible and is one of the one or more eligible cart combinations when at least one merchant of the plurality of merchants included in the cart combination is assigned to multiple products of the prospective cart.

9. The computer-implemented method of claim 7, wherein evaluating the price for each cart combination of the one or more eligible cart combinations comprises:
when the cart combination that is eligible includes a merchant of the plurality of merchants assigned to multiple products of the prospective cart, determining one or more box discounts of the cart combination, wherein:
the one or more box discounts comprise a cost saved by shipping the multiple products of the prospective cart from only the merchant of the plurality of merchants assigned to the multiple products of the prospective cart; and
the at least one discount comprises a box discount.

10. The computer-implemented method of claim 1, wherein the savings of each cart combination of the plurality of cart combinations is due to the first product and the at least one of the one or more other products being shipped from a same fulfillment center of the same merchant of the one or more merchants.

11. A non-transitory computer-readable medium comprising instructions that, when executed by a processor, cause the processor to perform a method comprising:
receiving, from a user of a merchant management system:
a request to price a first product as part of a prospective cart, the prospective cart comprising the first product and one or more other products in an existing cart, each respective product of the first product and the one or more other products being sold by one or more merchants of a plurality of merchants that offer the respective product at a respective offer price; and a competing price for the first product, the competing price having been collected from a competing merchant management system;

identifying a plurality of cart combinations for the prospective cart via the merchant management system, each cart combination of the plurality of cart combinations being a different combination of merchants of the plurality of merchants assigned to the products of the prospective cart, each merchant of the plurality of merchants for the products of the prospective cart assigned from the one or more merchants offering the respective product;

evaluating a price for each cart combination of the plurality of cart combinations by combining the respective offer price for each assigned merchant;

determining at least one cart discount for each cart combination of the plurality of cart combinations by calculating savings of each cart combination of the plurality of cart combinations, the savings of each cart combination of the plurality of cart combinations resulting from the first product and at least one of the one or more other products being fulfilled by a same merchant of the one or more merchants;

selecting a first cart combination of the plurality of cart combinations based on a lowest price of the first cart combination compared to other cart combinations of the plurality of cart combinations, the first cart combination resulting in at least one discount of the first cart combination, the at least one discount of the first cart combination comprising the at least one cart discount;

determining a product price of the first product based on the first cart combination, as selected, compared to a price of the existing cart; and in response to determining the product price of the first product, transmitting instructions to display, on an electronic device of the user, a user interface comprising:
- an information portion comprising a search bar, a discount tracker, and a cart tracker, wherein:
  the discount tracker is configured to:
    display a sum of each discount of the at least one discount of the first cart combination; and
    when selected by the user, display, in an expanded configuration, an itemized list showing a source of each discount of the at least one discount of the first cart combination; and
  the cart tracker is configured to display a number of products in the existing cart;
- a search indicator displayed on the user interface only after the request to price the first product has been received, the search indicator configured to display:
  a number of search results in response to the request to price the first product; and
  a total number of search results returned in response to the request to price the first product; and
- a product preview portion comprising:
  a product image of the first product;
  a product name of the first product;
  a product description preview of the first product;
  an add to cart button configured to, when selected by the user, add the first product to the existing cart; and
  pricing information comprising:
    the competing price of the first product;
    the respective offer price of the first product for a merchant of the plurality of merchants;
    the at least one discount; and
    the product price of the first product.

12. The non-transitory computer-readable medium of claim 11, wherein the price of the existing cart is based on a first assignment of merchants of the plurality of merchants to the first product and the one or more other products of the existing cart, wherein the first cart combination includes a second assignment of merchants of the plurality of merchants to the first product and the one or more other products of the existing cart, the merchants of the first assignment being different from the merchants of the second assignment.

13. The non-transitory computer-readable medium of claim 11, wherein the method further comprises:
receiving a request to add the first product to the existing cart;
receiving a request to purchase the existing cart including the first product; and
electronically coordinating a sale of the existing cart from each merchant assigned to the first product and the one or more other products in the existing cart in the first cart combination.

14. The non-transitory computer-readable medium of claim 13, wherein electronically coordinating the sale of the existing cart comprises:
generating one or more sub-orders for the merchants included in the first cart combination, each sub-order of the one or more sub-orders comprising one or more sub-order products that a merchant of the plurality of merchants associated with the sub-order is assigned to fulfill based on the first cart combination; and
transmitting each sub-order of the one or more sub-orders to its associated merchant for fulfillment of associated one or more sub-order products of the sub-order.

15. The non-transitory computer-readable medium of claim 11, wherein the method further comprises:
allocating the at least one cart discount between the first product and the one or more other products of the prospective cart, wherein the at least one discount further comprises the at least one cart discount, as allocated with respect to prices of the first product and the one or more other products of the prospective cart.

16. The non-transitory computer-readable medium of claim 11, wherein the method further comprises:
determining one or more eligible cart combinations from the plurality of cart combinations, wherein the one or more eligible cart combinations consist of one cart combination.

17. The non-transitory computer-readable medium of claim 16, wherein a cart combination of the plurality of cart combinations is eligible and is one of the one or more eligible cart combinations when at least one merchant of the plurality of merchants included in the cart combination is assigned to multiple products of the prospective cart.

18. The non-transitory computer-readable medium of claim 16, wherein evaluating the price for each cart combination of the one or more eligible cart combinations comprises:
when the cart combination that is eligible includes a merchant of the plurality of merchants assigned to multiple products of the prospective cart, determining one or more box discounts of the cart combination, wherein:
the one or more box discounts comprise a cost saved by shipping the multiple products of the prospective cart from only the merchant of the plurality of merchants assigned to the multiple products of the prospective cart; and
the at least one discount comprises a box discount.

19. The non-transitory computer-readable medium of claim 11, wherein the method further comprises
- storing one or more payment methods of the user, each payment of the one or more payment methods of the user having an associated fee;
- determining:
  - a payment method of the one or more payment methods of the user having a lowest fee; and
  - a payment method of the one or more payment methods of the user having a highest fee;
- in response to receiving the request to purchase the existing cart including the first product, transmitting instructions to display, on the electronic device of the user, a second user interface comprising a selectable element for each payment method of the one or more payment methods; and
- when the user selects a selectable element for the payment method of the one or more payment methods of the user having the lowest fee, applying a payment method discount comprising a difference between the highest fee and the lowest fee.

20. The non-transitory computer-readable medium of claim 11, wherein the savings of each cart combination of the plurality of cart combinations is due to the first product and the at least one of the one or more other products being shipped from a same fulfillment center of the same merchant of the one or more merchants.

* * * * *